United States Patent
Tomono et al.

[11] Patent Number: 6,023,318
[45] Date of Patent: Feb. 8, 2000

[54] ELECTRODE PLATE, PROCESS FOR PRODUCING THE PLATE, LIQUID CRYSTAL DEVICE INCLUDING THE PLATE AND PROCESS FOR PRODUCING THE DEVICE

[75] Inventors: Haruo Tomono, Machida; Masaru Kamio, Sagamihara; Hiroyuki Tokunaga, Fujisawa; Yuji Matsuo, Machida, all of Japan

[73] Assignee: Canon Kabushiki Kaisha, Tokyo, Japan

[21] Appl. No.: 08/831,639

[22] Filed: Apr. 9, 1997

[30] Foreign Application Priority Data

Apr. 15, 1996 [JP] Japan ................................ 8-092808

[51] Int. Cl.[7] ................................................ G02F 1/1343
[52] U.S. Cl. .......................... 349/146; 349/143; 349/147
[58] Field of Search ..................................... 349/146, 147, 349/143, 51, 108, 106

[56] References Cited

U.S. PATENT DOCUMENTS

| | | | |
|---|---|---|---|
| 4,714,636 | 12/1987 | Yokono et al. | 428/1 |
| 4,744,637 | 5/1988 | Sekimura et al. | 350/339 R |
| 4,797,316 | 1/1989 | Hecq et al. | 428/167 |
| 4,802,743 | 2/1989 | Takao et al. | 350/339 F |
| 4,917,471 | 4/1990 | Takao et al. | 350/339 F |
| 4,937,651 | 6/1990 | Yamazaki et al. | 357/52 |
| 5,019,479 | 5/1991 | Oka et al. | 430/172 |
| 5,101,289 | 3/1992 | Takao et al. | 359/68 |
| 5,410,423 | 4/1995 | Furushima et al. | 359/80 |
| 5,681,675 | 10/1997 | Kurauchi et al. | 430/20 |
| 5,717,475 | 2/1998 | Kamio et al. | 349/147 |
| 5,724,109 | 3/1998 | Nakamura et al. | 349/79 |

FOREIGN PATENT DOCUMENTS 6347819  12/1994  Japan .

*Primary Examiner*—William L. Sikes
*Assistant Examiner*—Joanne Kim
*Attorney, Agent, or Firm*—Fitzpatrick, Cella, Harper & Scinto

[57] ABSTRACT

An electrode plate for a liquid crystal device is constituted by a light-transmissive substrate, a plurality of metal electrodes disposed on the light-transmissive substrate with a spacing therebetween, an insulating layer disposed at the spacing, and a plurality of transparent electrodes disposed on the insulating layer and each electrically connected with an associated metal electrode at a first end portion thereof. The first end portion of the transparent electrode is located closer to the light-transmissive substrate than an adjacent end portion of an adjacent transparent electrode. The electrode plate is effective in providing a liquid crystal device with a wider optical modulation region while improving image qualities.

12 Claims, 12 Drawing Sheets

ELECTRODE PLATE, PROCESS FOR PRODUCING THE PLATE, LIQUID CRYSTAL DEVICE INCLUDING THE PLATE AND PROCESS FOR PRODUCING THE DEVICE

FIELD OF THE INVENTION AND RELATED ART

The present invention relates to an electrode plate, particularly an electrode plate provided with metal electrodes formed along transparent electrodes, and a production process and apparatus of the electrode plate. The present invention also relates to a liquid crystal device including the electrode plate and a production process thereof.

Liquid crystal display devices (cells) using a liquid crystal for displaying information have been used in various fields.

The cell structure of the liquid crystal devices has also been modified with increases in resolution and size required in recent years as follows.

(1) FIGS. 1A and 1B are schematic sectional and plan views, respectively, illustrating a liquid crystal display device of an initial stage.

Referring to FIG. 1A, a liquid crystal display device P1 includes a pair of glass substrates 1 oppositely disposed in substantially parallel with each other. Each glass substrate 1 is coated with a plurality of transparent electrodes 6, such as ITO (indium tin oxide) film, arranged in a stripe shape as shown in FIG. 1B, and further coated with an insulating film 6 and an alignment control film 9 in this order. The pair of glass substrates 1 are applied to each other via a sealing member 2 so as to leave a gap (cell gap) between the substrates 1, which (gap) is filled with a liquid crystal 3. The resultant liquid crystal display device P1 is driven by applying a prescribed pulse signal to the transparent electrodes 6.

However, these transparent electrodes 6 generally have a high resistivity, so that they have caused a problem of voltage waveform deformation due to electrical signal delay along with increases in resolution an size of the display area and in driving speed of the display device.

In order to solve the problem it may be possible to increase the thickness of the transparent electrodes 6, but the formation of such thick transparent electrodes requires increased time and cost and is liable to lower adhesiveness to the glass substrate 1.

(2) In order to solve the above-mentioned problems, it has been proposed disposing a low-resistance metal electrode under a transparent electrode so as to contact a glass substrate (as disclosed in Japanese Laid-Open Patent Application (JP-A) 6-347819).

FIGS. 2A and 2B illustrate a liquid crystal display device using such a low-resistance metal electrode.

As shown in FIG. 2A, a liquid crystal display device P2 includes a pair of oppositely disposed electrode plates 10 in parallel via a sealing member 2 and a liquid crystal 3 filling a spacing defined by the sealing member 2 and the pair of electrode plates 10.

Each electrode plate 10, as shown in FIG. 2B, comprises a glass substrate 11, a plurality of stripe-shaped metal electrodes 12 formed on the substrate 11 with a prescribed spacing therebetween, an insulating layer 13 (e.g., ultraviolet (UV)-curable resin layer) filling the spacing to form a substantially smooth surface together with the metal electrodes 12, and a plurality of transparent electrodes 6 formed on the smooth surface.

The electrode plate 10 may be formed through the following steps as illustrated in FIGS. 3A–3H.
(Metal electrode-forming step)

On the surface of a glass substrate 11, a ca. 1 $\mu$m-thick metal layer is formed by, e.g., sputtering, followed by patterning thereof through, e.g., a photolithographic process to form a multiplicity of metal electrodes 12 in the form of a stripe, thus preparing a metal wiring (circuit) plate A1 having a wiring face 15 shown in FIG. 3B.
(Resin-supplying step)

On the surface of a smooth or smoothing mold substrate (hereinafter called "smooth plate") 16, a prescribed amount of a liquid resin of a UV-curable resin 13L is placed dropwise by using a dispenser 17 (FIG. 3A). Then, on the smooth plate 16, the metal wiring plate A1 is superposed so as to fill the spacing between the metal electrodes 12 with the UV-curable resin 13L (FIG. 3B) to form a superposed structure (pressure-receiving structure) A2 (as shown in FIGS. 3C and 3D).
(Resin-molding step)

The pressure-receiving structure A2 is set in a press 19 including pressing plates 19a and 19b (FIG. 3C) and pressed by applying thereto a pressing force (pressure) F1 so as to make a contact of the metal electrodes 12 with the smooth plate 16, thus completely or substantially removing the UV-curable resin 13L from the metal electrode surface (i.e., no or very small amount of the resin 13L remains on the metal electrode surface) (FIG. 3D).
(Resin-curing step)

The pressure-receiving structure A2 is then taken out from the press 19 and irradiated with a UV light (or UV rays) L (FIG. 3E), whereby the UV-curable resin 13 is cured to form a UV-cured resin 13S.
(Peeling step)

After forming the UV-cured resin layer 13S, the smooth plate is peeled or removed from the metal wiring plate A1 (glass substrate 11 and metal electrode 12) coated with the UV-cured resin 13S by applying a force F2 in a direction of an arrow by means of a peeling device (not shown) (FIGS. 3F and 3G).
(Transparent electrode-forming step)

Thereafter, on the smooth surface formed by the metal electrodes 12 and the UV-cured resin 13S, a plurality of transparent electrodes 6 by sputtering, followed by patterning though a photolithographic process (FIG. 3H).
(Other steps)

On the surface of the transparent electrodes 6, an insulating layer 7 (shown in FIG. 2A) is formed and further thereon, an alignment control film 9 (shown in FIG. 2A) is formed, followed by rubbing treatment of the alignment control film 9 to prepare an electrode plate 10 (shown in FIG. 2A).

The thus-prepared pair of the electrode plates 10 are applied to each other via a sealing member while leaving a gap, which is filled with a liquid crystal 3 to provide a liquid crystal display device P2 shown in FIG. 2A.

In such an electrode plate 10 constituting the liquid crystal display device P2, in order to ensure an electrical insulating between adjacent electrodes, it is necessary to provide a spacing W between the transparent electrode 6 and the adjacent metal electrode 12 as shown in FIG. 3H. For this reason, when the display device P2 is driven, the liquid crystal 3 is not supplied with a voltage at the spacing W. As a result, the liquid crystal 3 located at the spacing W not only does not contribute anything to image display but also always allows light transmission thereat, thus leading to a lowering in image quality.

(3) In order to solve such a problem, there has been proposed an electrode plate 20 as shown in FIG. 4.

Referring to FIG. 4, the electrode plate 20 includes a masking (light-intercepting) layer 21 formed between a glass substrate 11 and a metal electrode 12 so as to prevent light transmission at the spacing W.

However, in such an electrode plate 20, in a wider region, light transmission is suppressed since the masking layer 21 has a width wider than the metal electrode 12. As a result, an amount of light passing through the resultant liquid crystal display device is decreased, i.e., an opening rate of the display device is lowered, thus resulting in a dark image. Further, the formation of the masking layer 21 leads to complicated production steps and increased production cost.

(4) In order to obviate such difficulties, there has been proposed an electrode plate and production process thereof wherein an insulating layer is formed in a particular shape, as disclosed in JP-A 2-63019.

FIG. 5 shows a schematic sectional view of such an electrode plate. Referring to FIG. 5, the electrode plate includes a glass substrate 11, a plurality of metal electrodes 12A and 12B formed on the substrate 11 with a spacing, which is filled with an insulating layer material 33, such as a photosensitive polyimide resin. The insulating layer has a particular shape such that a thick portion 33a has a lateral end 33b providing an oblique plane to the surface of the metal electrode 12 and partially covering the metal electrode surface. The surface of the metal electrode 12 is partially covered with the insulating resin 33 at both end portions so as to expose a central portion thereof.

On each metal electrode 12A (12B) and the insulating resin 13, a transparent electrode 36 of, e.g., ITO film is formed while contacting the metal electrode 12A at the central portion thereof and extends along the longitudinal direction of the metal electrode 12A. At a lateral end portion, the transparent electrode 36 is turned down along the oblique plane 33b of the insulating resin 33 and contacts the metal electrode 12A at its central portion and then is turned up along the adjacent oblique plane of the insulating resin 33 to provide an end 36a as shown in FIG. 5. The end 36a is located at the same level as a principal plane of the transparent electrode 36. On the other hand, the other end 36b of the transparent electrode 36 is located over an end E of the metal electrode 12B (disposed adjacent to the metal electrode 12A) so as to substantially align the end 36b with the end E in a direction perpendicular to the glass substrate 11.

Next, an example of the production process of the above-described electrode plate (FIG. 5) will be described with reference to FIGS. 6A–6D.

A plurality of metal electrodes 12 are formed on a glass substrate 11 to provide a metal wiring plate A1 (FIG. 6A).

Onto the metal wiring plate A1, a liquid photosensitive resin 33L is applied by, e.g., spin coating so as to completely cover the surface of the metal electrodes 12 (FIG. 6B).

Irradiation with light L to the above metal wiring plate A1 is performed by using a photomask 37 including a masking portion 37a having a width narrower than the metal electrode 12 to cure the photosensitive resin 33L (FIG. 6C), followed by patterning of the cured photosensitive resin 33 by immersing the metal wiring plate A1 coated with the photosensitive resin 33 in, e.g., a developing liquid (not shown) to provide the photosensitive resin 33 with a prescribed shape (FIG. 6D).

On the photosensitive layer, a plurality of transparent electrodes are formed to prepare an electrode plate as shown in FIG. 5.

The resultant electrode plate has a larger opening rate due to the end 36b of the transparent electrode 36 substantially extending over the end E of the adjacent metal electrode 12B as described above, thus allowing a bright image.

Incidentally, the above-mentioned photosensitive resin 33 is required to be excellent in patterning properties and durability and a thick portion (33a in FIG. 5) thereof is required to provide a flat (even) surface.

However, it has been difficult to find out such an ideal photosensitive resin satisfying the above requirements, thus failing to actually practice the above production process. Further, the photosensitive resin 33 is not readily formed in a prescribed shape (trapezoidal shape shown in FIG. 5) by controlling conditions in the developing step. Particularly, it is very difficult to ensure a prescribed oblique angle of the lateral end 33b of the photosensitive resin 33 and the lateral end 33b is liable to provide a plane perpendicular to the metal electrode surface. In such a case, the transparent electrodes 36 are liable to cause a breakage thereof as shown in FIG. 7.

SUMMARY OF THE INVENTION

In view of the above-mentioned problems, a principal object of the present invention is to provide an electrode plate capable of providing a liquid crystal display device of a high resolution and a large area without causing a voltage waveform deformation due to electrode signal delay.

Another object of the present invention is to provide an electrode plate capable of ensuring an increased optical modulation region while suppressing a leakage of light to provide a bright image and an excellent image quality and to decrease a light quality (illuminance) of a backlight device thereby to reduce a power consumption while retaining a high brightness.

Another object of the present invention is to provide an electrode plate which is simply and readily produced to reduce a production cost and capable of preventing a breakage of transparent electrodes connected to metal electrodes.

Another object of the present invention is to provide an electrode plate capable of providing an excellent color display device free from a charge in color (discoloration) of a color filter.

A further object of the present invention is to provide a process for producing the above-described electrode plate, a liquid crystal device using the electrode plate, a process for producing the liquid crystal device, and an apparatus for producing the electrode plate.

According to the present invention, there is provided an electrode plate, comprising: a light-transmissive substrate, a plurality of metal electrodes disposed on the light-transmissive substrate with a spacing therebetween, an insulating layer disposed at the spacing, and a plurality of transparent electrodes disposed on the insulating layer and each electrically connected with an associated metal electrode at a first end portion thereof, wherein the first end portion of the transparent electrode is located closer to the light-transmissive substrate than an adjacent end portion of an adjacent transparent electrode.

According to the present invention, there is also provided a process for producing an electrode plate, comprising the steps of:

forming a plurality of metal electrodes on a light-transmissive substrate with a spacing therebetween, supplying a curable resin to the spacing between the metal electrodes, molding the curable resin into a prescribed shape, curing the curable resin, and forming on the cured resin a plurality of transparent electrode, wherein in the resin-molding step, the prescribed shape of the resin is formed by pressing against the resin a mold plate comprising a base substrate and a plurality of projections disposed on the base substrate each having a width narrower than a width of each metal electrode and at least one oblique end portion with respect to a surface of the metal electrode so as to align a prescribed position of each projection with a corresponding position of each metal electrode.

According to the present invention, there is further provided a liquid crystal device, comprising:

a pair of electrode plates and a liquid crystal disposed between the electrode plates;

at least one of the electrode plates comprising a light-transmissive substrate, a plurality of metal electrodes disposed on the light-transmissive substrate with a spacing therebetween, an insulating layer disposed at the spacing, and a plurality of transparent electrodes disposed on the insulating layer and each electrically connected with an associated metal electrode at a first end portion thereof, wherein the first end portion of the transparent electrode is located closer to the light-transmissive substrate than an adjacent end portion of an adjacent transparent electrode.

According to the present invention, there is still further provided a process for producing a liquid crystal device comprising a pair of electrode plates and a liquid crystal disposed therebetween, said process comprising the steps of:

forming a plurality of metal electrodes on a light-transmissive substrate with a spacing therebetween, supplying a curable resin to the spacing between the metal electrodes, molding the curable resin into a prescribed shape, curing the curable resin, and forming on the cured resin a plurality of transparent electrode to prepare a pair of electrode plates, disposing the electrode plates opposite to each other while leaving a gap therebetween, and filling the gap with a liquid crystal, wherein in the resin-molding step, the prescribed shape of the resin is formed by pressing against the resin a mold plate comprising a base substrate and a plurality of projections disposed on the base substrate each having a width narrower than a width of each metal electrode and at least one oblique end portion with respect to a surface of the metal electrode so as to align a prescribed position of each projection with a corresponding position of each metal electrode.

The present invention also provides a production apparatus of an electrode plate, comprising:

a resin-supplying unit for supplying a curable resin to a surface of a substrate having thereon a plurality of metal electrodes or a surface of a mold plate comprising a base substrate and a plurality of projections disposed on the base substrate each having at least one oblique end portion with respect to a surface of the base substrate and each having a width narrower than a width of each metal electrode, a resin-molding unit for molding the curable resin by pressing the mold plate against the resin so as to align a prescribed position of each projection with a corresponding position of each metal electrode, a resin-curing unit for curing the curable resin, and a peeling unit for peeling the mold plate from a surface of the cured resin.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
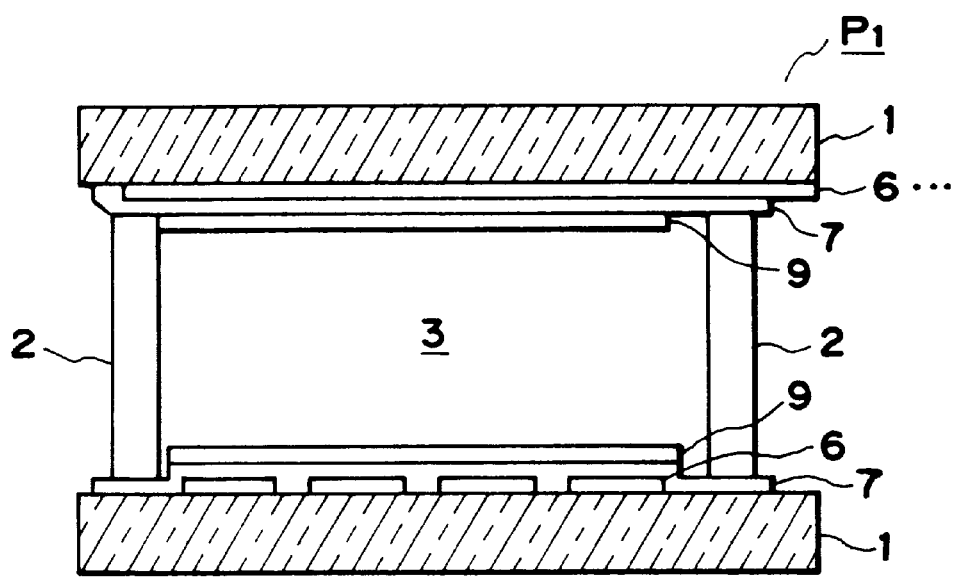
FIG. 1A is a schematic sectional view showing an embodiment of a conventional liquid crystal display device and FIG. 1B is a schematic plan view showing a transparent electrode pattern employed in the display device shown in FIG. 1A.
Figure 1B:
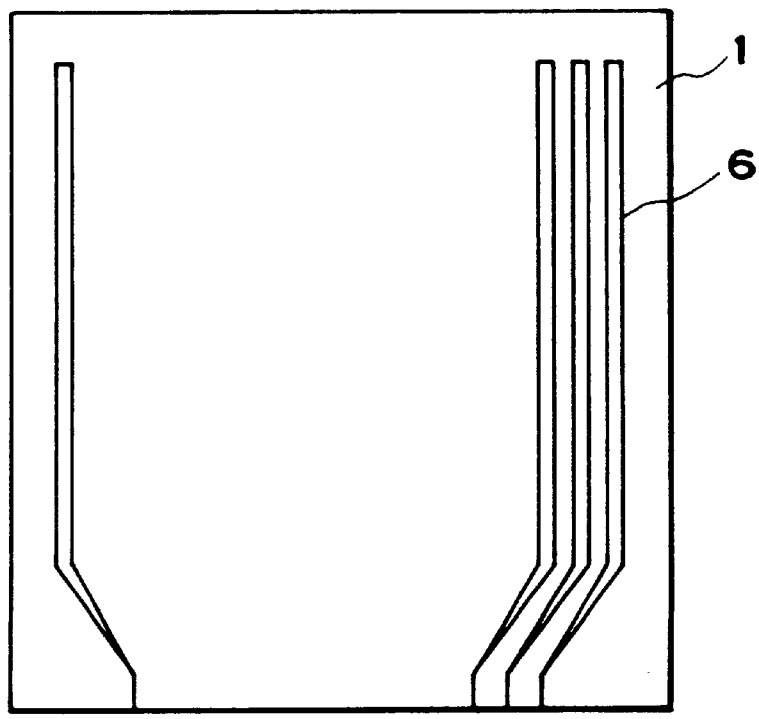
Figure 2A:
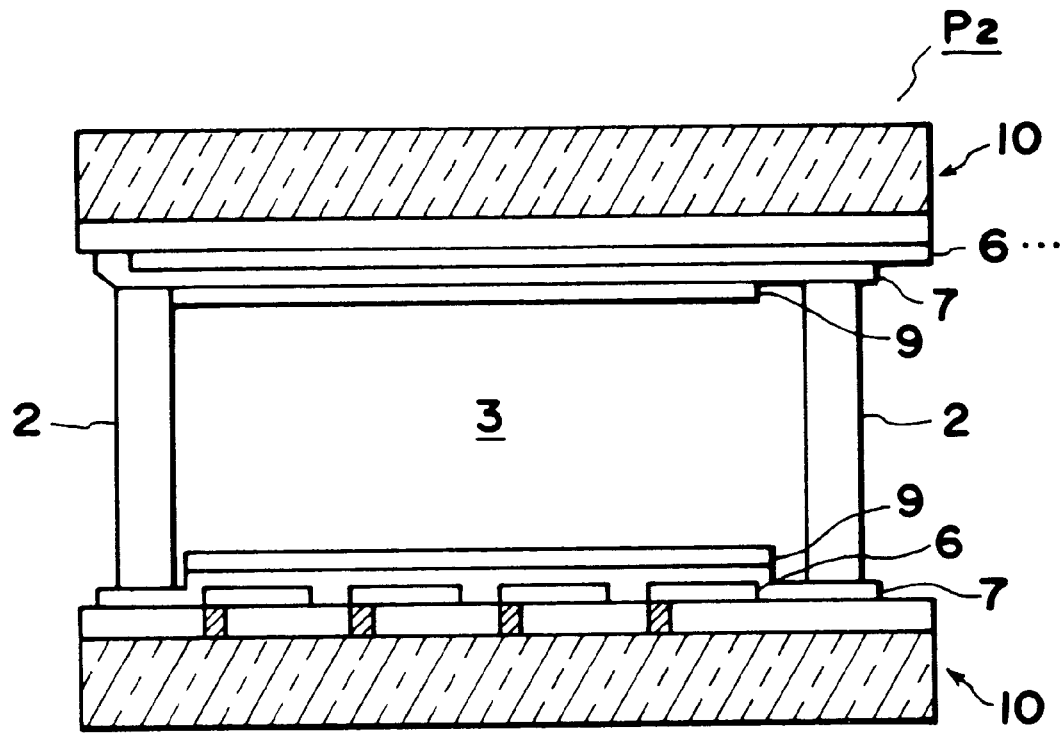
FIG. 2A is a schematic sectional view of another embodiment of a conventional liquid crystal display device and FIG. 2B is an enlarged view of an electrode plate used in the display device shown in FIG. 2A.
Figure 2B:
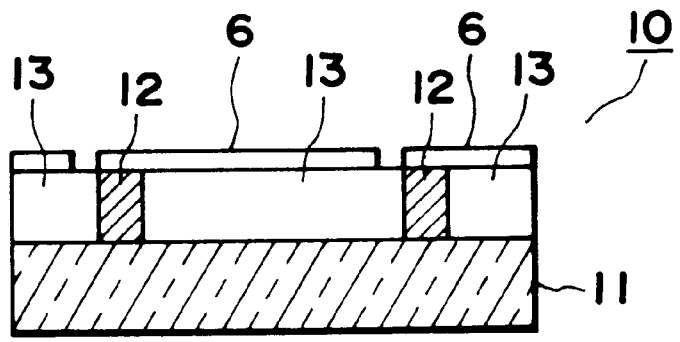

Hereinbelow, preferred embodiments of the present invention will be described with reference to FIGS. 8–19. In these figures, identical reference numerals are used for describing identical structural members or materials shown in FIGS. 1–7 and explanation thereof is omitted, unless otherwise noted.

<First Embodiment>

A first embodiment of the present invention will be described with reference to FIGS. 8–13.

Figure 8A:
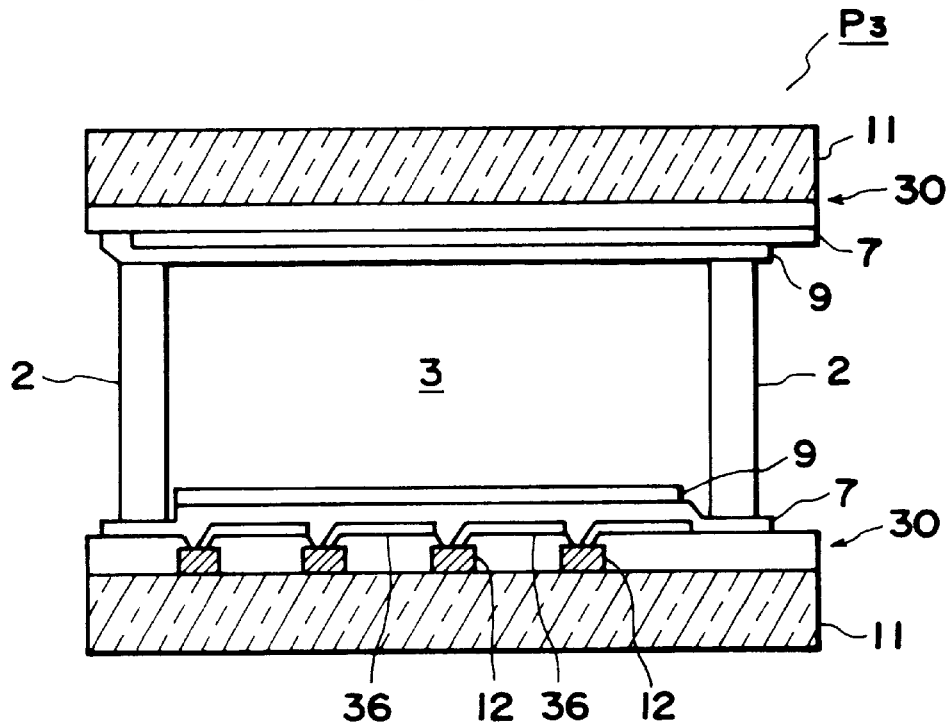
FIG. 8A is a schematic sectional view showing an embodiment of a liquid crystal device including an electrode plate according to the present invention and FIG. 8B is an enlarged view of the electrode plate shown in FIG. 8A.

FIG. 8A shows a liquid crystal device prepared in this embodiment.

Referring to FIG. 8A, a liquid crystal device $P_3$ includes a pair of electrode plates 30 disposed in substantially parallel with each other.

Figure 8B:
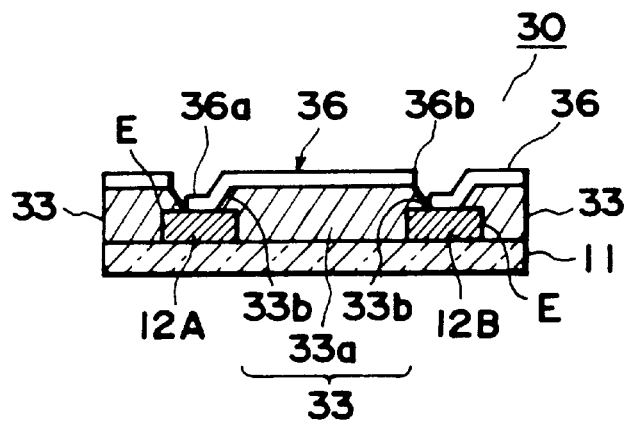

Each electrode plate 30, as shown in FIG. 8B includes a glass substrate 11, a plurality of metal electrodes 12A and 12B formed in a stripe shape on the glass substrate 11 with a spacing therebetween, which is filled with a UV-curable resin 33 for forming an insulating layer to be cured by irradiation with UV rays.

Figure 9A:
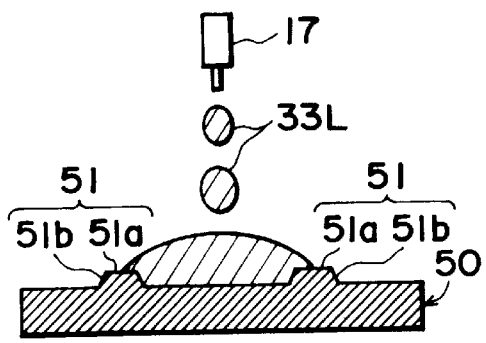
FIGS. 9A–9H are schematic sectional views for illustrating a series of steps generally involved in a process for producing the electrode plate shown in FIG. 8B according to the present invention.

The UV-cured resin layer 33 includes a thick portion 33a with both lateral ends 33b each forming an oblique plane providing a prescribed inclination angle with respect to the metal electrode surface and partially covering one end portion of the metal electrode 12A (12B). The metal electrode 12A (12B) is not coated with the UV-cured resin 33 (33b) at a central portion thereof. The central portion of the metal electrode 12 (12A, 12B) together with the adjacent lateral ends 33b forms a spacing portion having an isosceles trapezoidal sectional shape (a trapezoid including parallel sides and nonparallel sides (corr. to the lateral ends 33b) having an identical length together with the extension line of the UV-cured resin surface as shown in FIG. 9G.

In this embodiment, the UV-cured resin layer 33 may preferably include the lateral end (oblique plane) 33b providing an inclination angle (formed with the metal electrode surface) in a range of 15–60 degrees. If the inclination angle is below 15 degrees, the oblique plane of the lateral end 33b has a too large width, thus failing to partially cover the end portion of the metal electrode surface. As a result, a transparent electrode 36 formed on the UV-cured resin layer (insulating layer) 33 is liable to lose its flatness, thus leading to an irregularity in threshold voltage and alignment defects in some cases. On the other hand, if the inclination angle exceeds 60 degrees, the transparent electrode 36 is liable to cause a breakage thereof at the lateral end portion 33b (of the UV-cured resin layer 33), thus resulting in conduction failure. Particularly, the breakage of the transparent electrode 36 can more readily caused in a later step, such as a step of forming an alignment control film under heating since the transparent electrode is subjected to thermal expansion and shrinkage.

The UV-cured resin layer 33 may preferably have a thickness at the thick portion 33a such that a height of the thick portion 33a is larger than that (thickness) of the metal electrode 12 (12A, 12B) by 0.1–5 μm, particularly 0.2–3 μm.

If the difference in height between the thick portion 33a and the metal electrode 12 is below 0.1 μm, it becomes difficult to ensure an electrical insulation between the metal electrode 12 and the adjacent transparent electrode 36 due to an unevenness of the metal electrode 12 and a pinhole in the UV-cured resin layer 33. Further, if the difference in height is above 5 μm, it is difficult to partially cover the end portion of the metal electrode surface while retaining a prescribed inclination angle of the lateral end 33b, thus resulting in difficulties as in the case of the inclination angle of below 15 degrees.

Referring again to FIG. 8B, the transparent electrodes 36 (e.g., ITO film) are formed in a stripe shape along the metal electrodes 12A and 12B and has a lateral end 36a electrically connected with the metal electrode 12A through an oblique portion (along the lateral end 33b) turned down from the surface plane of the transparent electrode 36. The transparent electrode 36 also has the other lateral end 36b located over the adjacent metal electrode 12B so as to partially cover (or overlap with) an end portion including a lateral edge E of the metal electrode 12B via the lateral end 33b of the UV-cured resin 33 when viewed from a direction perpendicular to the glass substrate 11. The lateral end 36b may be aligned with the lateral edge E of the metal electrode 12B when viewed from a direction perpendicular to the glass substrate 11.

The lateral end 36a of the transparent electrode 36 contacting the metal electrode 12A (12B) is located closer to the glass substrate 11 than the adjacent lateral end 36b of the adjacent transparent electrode 36 due to the difference in height between the thick portion 33a (of the UV-cured resin 33) and the metal electrode 12A (12B), thus ensuring an electrical insulation between adjacent transparent electrodes 36 while minimizing a spacing therebetween since the lateral ends 36a and 36b are disposed at difference levels.

The glass substrate 11 may generally have a thickness of ca. 1 mm and may preferably have good parallel properties (i.e., high flatness or smoothness) through polishing thereof on both sides. Examples of a material for such a glass substrate 11 may include those generally used as a liquid crystal device substrate, such as soda glass (blue plate glass).

The metal electrodes 12 may preferably comprise metal materials having a small resistivity (electrical resistance) and a good adhesiveness to the glass substrate 11 and being readily formed in a thickness of ca. 1 μm by, e.g., vapor deposition or sputtering. Examples of such a metal materials may include aluminum (Al), chromium (Cr), molybdenum (Mo), Tungsten (W), gold (Au), silver (Ag) and copper (Cu). Of these materials, Al and Cu are more preferred.

In this embodiment, it is possible to effect a surface treatment with, e.g., a silane coupling agent at the surface of the metal electrodes 12 so as to improve an adhesiveness between the metal electrodes 12 and the UV-cured resin 33.

The transparent electrodes 36 may be a film of ITO, indium oxide or tin oxide formed in a thickness of 100–5000 Å. Below 100 Å, the resultant transparent electrodes are liable to have a large resistivity and cause a breakage thereof leading to conduction failure. Above 5000 Å, a light transmittance of the resultant transparent electrodes is liable to be lowered, thus resulting in a deterioration in display quality when used in a display device.

The UV-cured resin layer 33 may be formed through polymerization of a mixture of a polymerization initiator and a monomer or oligomer for an UV-curable resin of acrylic-type, epoxy-type or ene-thiol type (having a double bond and an SH group) but is required to have sufficient resistances to heat, chemicals and washings in, e.g,, a sputtering step of ITO film and a hot-curing step of an alignment control film in electrode plate production. For example, the UV-curable resin 33 may preferably comprise a reactive oligomer (as a main component) into which a heat-resistant molecular structure is introduced or which is increased in degree of crosslinking by polyfunctional monomers.

Then, a specific production process for producing the electrode plate 30 (shown in FIG. 8B) in this embodiment will be explained with reference to FIGS. 9A–9H.

(Metal electrode-forming step)

Figure 9B:
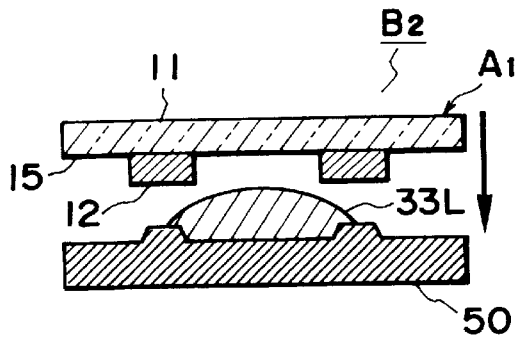

A plurality of metal electrodes 12 are formed on a glass substrate 11 to provide a metal wiring plate A1 as shown in FIG. 9B.

(Resin-supply step)

In this step, a particular mold plate 50 shown in FIG. 9A is used.

More specifically, the mold plate 50 has a multiplicity of projections 51 each including a flat portion 51a and lateral end portions 51b each providing an oblique plane preferably having an inclination angle of 15–60 degrees with respect to the non-projected (smooth) surface of the mold plate 50. The flat portion 51a is caused to contact a central portion of the associated metal electrode 12 in a resin-molding step described hereinafter, thus exposing the central portion. Each projection 51 has a shape of an almost isosceles trapezoid as shown in FIG. 9A. The isosceles-trapezoidal shape of the projection 51 corresponds to a shape of an exposed portion So of a UV-cured resin layer 33 on the metal electrode 12 as shown in FIG. 9G. The projection 51 may preferably have a height of 0.1–5 $\mu$m, more preferably 0.2–3 $\mu$m.

The mold plate 50 described above may comprise a material having a prescribed stiffness (or rigidity), such as metal, glass or ceramics. In the case where the projection 51 is formed on a base plate of the mold plate 50 by precise cutting the mold plate 50 may preferably comprise a material having a good cutting property (a property of being readily cut), such as copper, phosphor bronze, brass, aluminum or nickel, or a laminated structure including a stiff base substrate and a layer of the above material formed thereon by, e.g., plating, constituting the projections 51.

Figure 10:
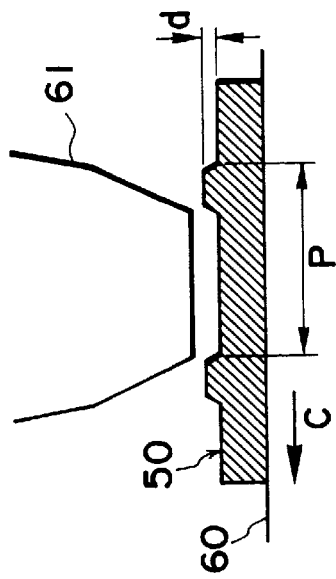
FIG. 10 is a schematic sectional view for illustrating an embodiment of a processing step of a mold plate used in the present invention.

Then, the projections 51 of the mold plat 50 may, e.g., be formed in the following manner. The surface of the mold plate 50 is smoothed or flattened by, e.g., polishing. The smoothed mold plate 50 is fixed on a processing table 60 as shown in FIG. 10, followed by cutting with a cutting tool 61. After the processing table 60 is moved in a direction C by a length P, a similar cutting operation is repeated to provide a multiplicity of projections 50 having a prescribed height corresponding to a cutting depth d of the smoothed mold plate 50. At this time, the moving length P corresponds to a pitch of the projections 50 each having a prescribed width.

The thus-formed mold plate 50 may preferably have a higher flatness and a surface roughness of within ±100 nm, more preferably ±20 nm. The surface roughness may be measured according to a heterodyne interference method by using a measuring apparatus ("Heterodyne Profile Motor HP-3000", mfd. by Zygo Co.).

On the mold plate 50, a prescribed amount of a liquid UV-curable resin 33L is placed dropwise by using a dispenser 17 as shown in FIG. 9A.

The metal wiring plate A1 is superposed on the mold plate 50 so that the wiring face 15 of the metal wiring plate A1 contacts the UV-curable resin 33L to fill the spacing between the metal electrodes 12 with the UV-curable resin 33L without forming air bubbles at the spacing, thus preparing a pressure-receiving structure B2 (FIG. 9B).

Then, a positional alignment of the metal wiring plate A1 with the mold plate 50 so that the center line of the projection 51 of the mold plate 50 coincides with (is aligned with) that of the associated metal electrode 12 may be performed by detecting alignment marks on the metal wiring plate A1 and mold plate 50 by means of, e.g., a microscope or according to an ordinary positional alignment method adopted in a photolithographic process.

(Resin-molding step)

Figure 9C:
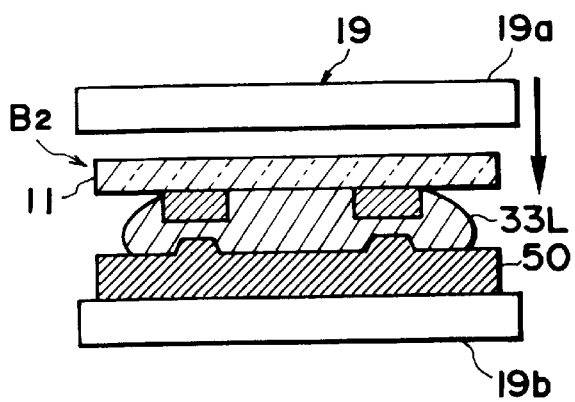
Figure 9D:
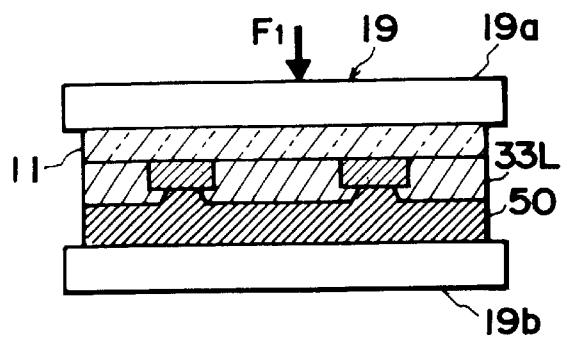

The above-prepared pressure-receiving structure B2 is disposed between a pair of pressing plates 19a and 19b of a press 19, followed by pressing of the pressure-receiving structure B2 under a pressure force F1 (FIGS. 9C and 9D).

As a result, the UV-curable resin 33L is pressed by the mold plate 50, while the projections 51 of the mold plate 50 intimately contact the metal electrode, to be formed in a prescribed shape defined by the mold plate 50. At this time, the UV-curable resin 33L is completely removed from the metal electrode surface or removed to the extent that a very small amount of the UV-curable resin 33L remains at a part of the metal electrode surface.

The press 19 may be a pressing means capable of expanding (extending) a region of the UV-curable resin 33L over the entire glass substrate 11. Examples of such a pressing means may include those using a hydraulic cylinder or an air cylinder, a liquid-pressure press and a roller press.

In the above pressing operation, a pressure F1 exerted on the pressure-receiving structure B2 by the press 19 may preferably be 5–50 kg/cm$^2$. Further, in the pressing operation, the pressure-receiving structure B2 may be heated for reducing a viscosity of the UV-curable resin 33L so as to be smoothly expanded by using pressing plates 19a and 19b each containing an electrothermal heater or a heating liquid or using a heating device, such as a hot plate or an oven.

(Resin-curing step)

Figure 9E:
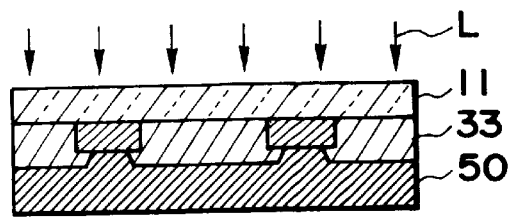

Thereafter, the pressure-received structure B2 is taken out from the press 19, the UV-curable resin 33 is irradiated with UV rays L issued from a UV lamp (not shown) via the glass substrate 11 to completely cure the UV-curable resin 33 (FIG. 9E).

As the UV lamp for curing the UV-curable resin 33, it is possible to use, e.g., a high-pressure or low-pressure mercury lamp or a xenon lamp, or other lamps capable of curing the UV-curable resin 33.

The UV rays passes across the glass substrate 11 to reach the UV-curable resin 33, so that there occurs a loss of light energy within the glass substrate 11. Accordingly, the UV rays used may preferably have an illuminance sufficient to cure the UV-curable resin 33 irrespective of such a light energy loss.

In this embodiment, curable resins other than the UV-curable resin 33, such as those cured by irradiation with, e.g., visible rays or infrared rays may also be used.

(Peeling step)

Figure 9F:
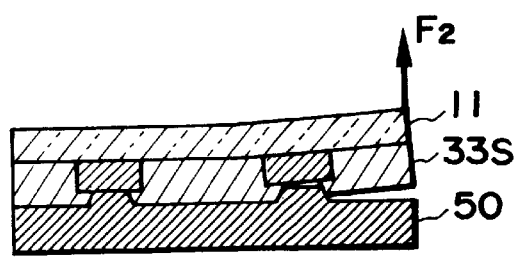
Figure 9G:
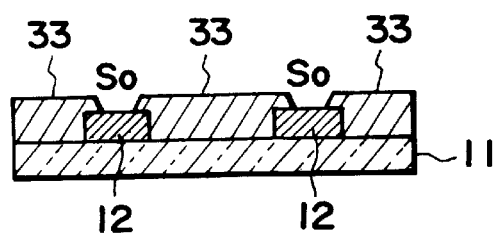

After forming the UV-cured resin layer 33 by UV ray-irradiation, the mold plate 50 is peeled or removed from the metal wiring plate A1 having thereon the molded UV-cured resin 33 by using a peeling device (not shown) wile applying a force F2 in a direction of an arrow to provide the metal electrode 12 with an exposed portion So having a particular shape (isosceles trapezoidal shape) (FIGS. 9F and 9G).

The above peeling step may be performed in such a state that the UV-curable resin 33 is not completely cured. In this instance, the UV-curable resin 33 may be irradiated with UV rays again after the peeling of the mold plate 50, thus completing the curing of the UV-curable resin 33. In such a case, even if the illuminance of the UV lamp used is lower than that sufficient to completely cure the UV-curable resin 33, the resin 33 can be cured completely by the additional irradiation with UV rays issued from such a UV lamp.

(Transparent electrode-forming step)

Figure 9H:
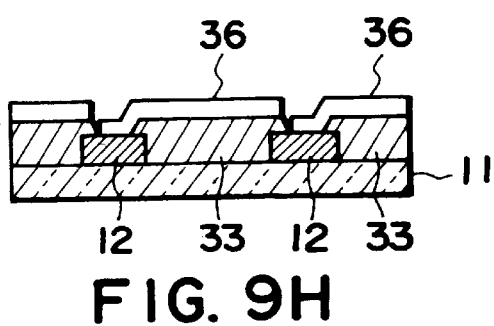

On the exposed portions So of the metal electrodes 12 and the UV-curable resin layer 33, a plurality of transparent electrodes 36 of ITO film are formed along the associated metal electrodes 12, respectively (FIG. 9H).

(Other steps)

Then, an insulating film 7 and an alignment control film 9 (as shown in FIG. 8A) are formed so as to cover the transparent electrodes 36 to prepare an electrode plate 30.

The thus prepared pair of electrode plates 30 are applied to each other via a sealing member 2 to leave a gap, which is then filled with a liquid crystal 3, thus preparing a liquid crystal device P3 shown in FIG. 8A.

In this embodiment, the liquid crystal device P3 may include one electrode plate 30 prepared in the above described manner. The alignment control film 9 may comprise the same or different materials.

Hereinbelow, an example of a production apparatus of the above-described electrode plate 30 will be explained with reference to FIG. 11.

Figure 11:
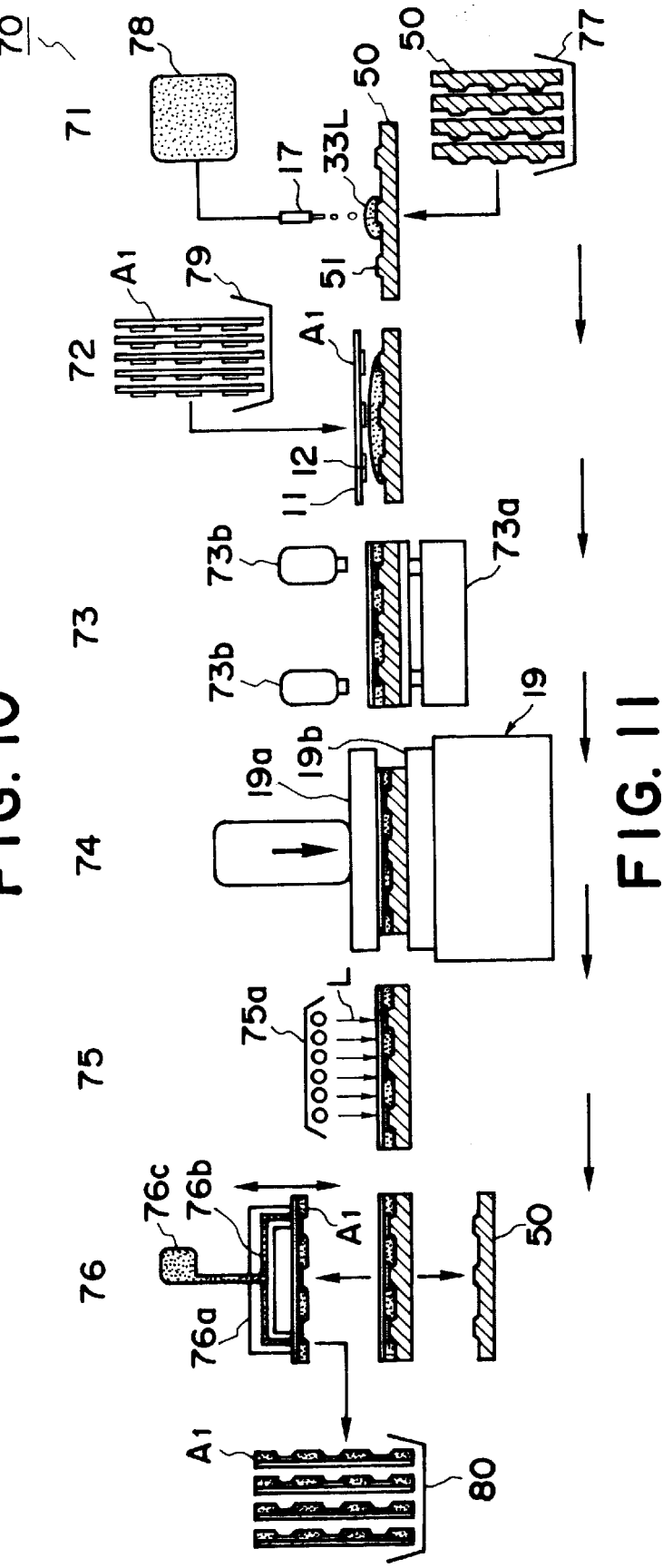
FIG. 11 illustrates an embodiment of a production apparatus of an electrode plate according to the present invention.

Referring to FIG. 11, an apparatus 70 for producing the electrode plate 30 includes a resin-applying unit 71, a resin-supplying unit 72, a positioning unit 73, a resin-molding unit 74, a resin-curing unit 75 and a peeling unit 76. In a mold plate stocker 77, a multiplicity of mold plates 50 are stored or stocked.

One of the mold plates 50 is supplied from the mold plate stocker 77 to a prescribed position of the resin-applying unit 71. At the position, a prescribed amount of a liquid UV-curable resin 33L is placed dropwise on the surface of the mold plate 50.

The mold plate 50 is then moved to the resin-supplying unit 72, wherein a metal wiring plate A1 supplied from a metal wiring plate stocker 79 is superposed on the mold plate 50 so as to fill spacings between metal electrodes 12 (formed on a glass substrate 11 of the metal wiring plate A1) with the UV-curable resin 33L. At this time, the resultant superposed (pressure-receiving) structure may be left standing for a short time in order to expand the UV-curable resin 33L to some extent, as desired.

The superposed structure including the mold plate 50 and the metal wiring plate A1 is moved to the positioning unit 73, wherein a positional alignment is performed by using a precise positioning table 73a and microscopes 73b so as to align a position of the center line of projections 51 of the mold plate 50 with that of the center line of the associated metal electrodes 12. In this instance, the respective positions of the center lines may be deviated from each other, as desired.

The pressure-receiving (superposed) structure (B2 as shown in FIGS. 9B and 9C) comprising the mold plate 50 and metal wiring plate A1 is conveyed to the resin-molding unit 74, wherein the structure is pressed by a press 19 including a pair of pressing plates 19a and 19b, thus molding (forming) the UV-curable resin 33L into a prescribed shape.

The pressure receiving structure is then conveyed to the resin-curing unit 75, wherein curing of the UV-curable resin 33L is performed by irradiation of UV rays L issued from a UV lamp 75a.

Thereafter, the pressure-receiving structure is moved to the peeling unit 76 including a vacuum chuck 76a which is movable upward and downward and under which a vacuum passage 76b is disposed and communicates with a vacuum pump 76c.

Under a vacuum condition, the movable vacuum chuck 76a is moved upward, whereby the metal wiring plate A1 carrying thereon the UV-cured resin is peeled from the mold plate 50.

The thus-treated metal wiring plate A1 is then moved and stored in a product stocker 80 by using a loading device, such as an auto-hand robot.

On the other hand, the mold plate 50 after the peeling operation is stored again in the mold plate stocker 77 after being subjected to, e.g., a washing step and is reused.

The pressure-receiving structure is moved between the respective units 71–76 by means of, e.g., a conveyer. The respective units 71–76 of the electrode plate production apparatus 70 are controlled by a sequence controller.

The electrode plate 30 produced by the apparatus 70 is moved to a transparent electrode-forming unit (not shown), wherein a plurality of transparent electrodes 36 are formed in a particular shape as shown in FIG. 9H on the metal electrodes 12 and the UV-cured resin 33.

According to this embodiment, the metal electrodes 12 are formed along the transparent electrodes 36 while ensuring good electrical connection therebetween, it is possible to provide an electrode plate free from a voltage waveform deformation due to electrical signal delay. In a specific example, the resultant connection structure of the electrodes 12 and 36 showed an electrical resistance of at most 500 ohm per a length of 240 mm. When a liquid crystal device P3 is formed by using the thus-formed electrode plates 30, the resultant liquid crystal device P3 can have a large picture area and a high resolution.

Figure 3A:
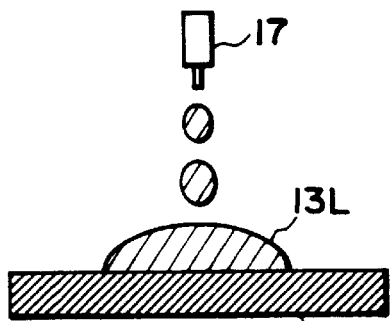
FIGS. 3A–3H are schematic sectional views for illustrating a series of steps generally involved in a conventional process for producing the electrode plate used in the display device shown in FIG. 2A.
Figure 3E:
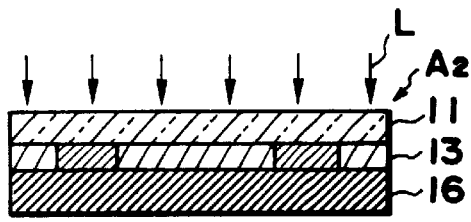
Figure 3B:
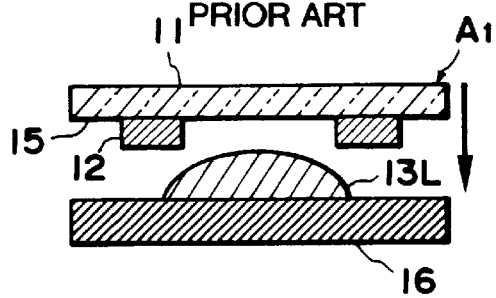
Figure 3F:
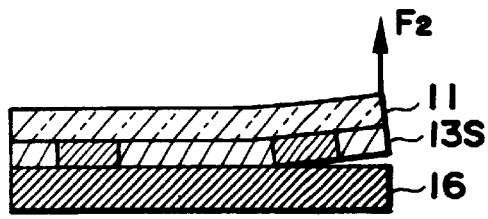
Figure 3C:
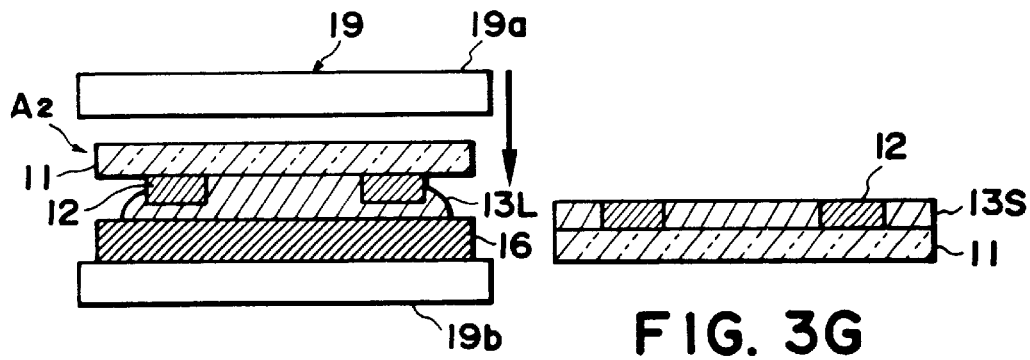
Figure 3G:
Figure 3D:
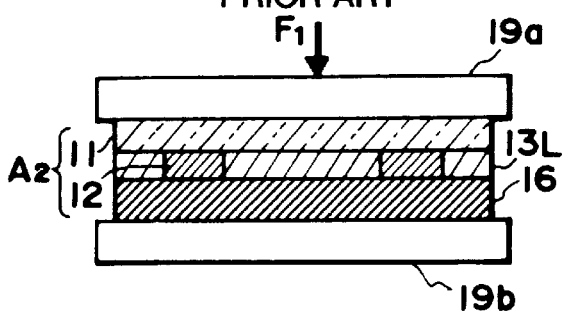
Figure 3H:
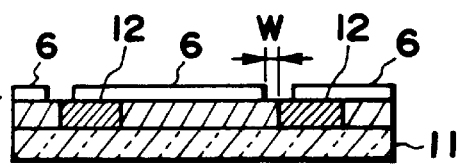
Figure 4:
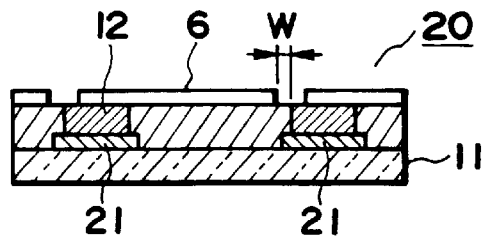
FIGS. 4 and 5 are schematic sectional views each showing an embodiment of a conventional electrode plate, respectively.
Figure 5:
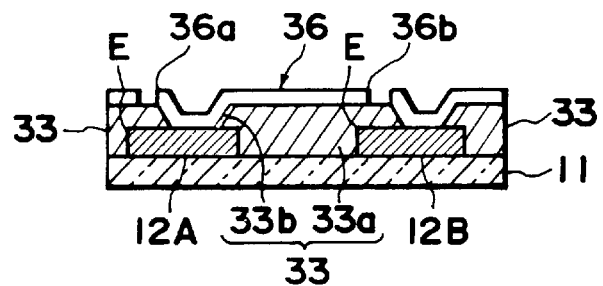
Figure 6A:
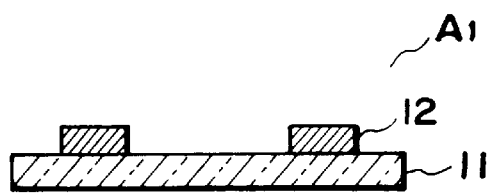
FIGS. 6A–6D are schematic sectional views for illustrating a series of steps generally involved in a conventional process for producing the conventional electrode plate shown in FIG. 5.
Figure 6B:
Figure 6C:
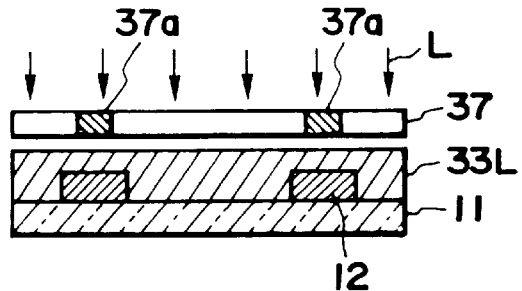
Figure 6D:
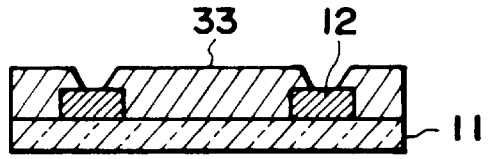
Figure 7:
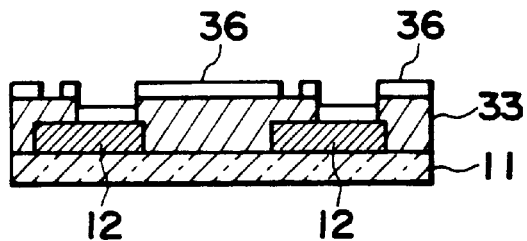
FIG. 7 is a schematic sectional view of an embodiment of a conventional electrode plate for illustrating a state of a breakage of a transparent electrode.

Further, in this embodiment, the UV-cured resin 33 and the metal electrode do not form a horizontal plane in combination as shown in FIG. 3H or 4 but form a stepwise shape at the central portion of each metal electrode 12 as shown in FIG. 8B or 9H, so that it is not necessary to provide a spacing W between the transparent electrode 36 and the adjacent metal electrode 12 as shown in FIG. 3H and it becomes possible to extend the end portion 36b of the transparent electrode 36 to the position where the end portion 36b is aligned with or partially overlaps with the side end E of the metal electrode 12A (12B) as shown in FIG. 8B. As a result, it is unnecessary to form the masking layer 21 as shown in FIG. 4, thus preventing a lowering in transmitted light quantity leading to a dark display image. For this reason, it becomes possible to reduce a luminance of the backlight device, thus resulting in a liquid crystal display device of a high brightness and a reduced power consumption. Further, the omission of the masking layer simplifies the production process, thus reducing a production cost. In addition, the respective transparent electrodes approach the adjacent transparent electrodes, respectively, so that a switching region of the liquid crystal is expanded, thus improving image qualities.

In this embodiment, the UV-curable resin 33 is mold into a precise sectional shape (as shown in FIG. 8B) since the mold plate 50 having a high flatness is used therefor. As a result, the production process is simplified and it is possible to prevent a breakage of the transparent electrodes 36 leading to conduction failure. Further, a flatness of the thicker portion 33a of the UV-cured resin 33 is improved when compared with the case of using a spin coating method, so that the upper layers formed thereon, such as the transparent electrodes 36, the insulating film 7 and the alignment control film 9 are also improved in flatness correspondingly, thus ensuring a uniform cell gap while retaining a good alignment characteristic of the liquid crystal 3. As a result, a production yield of the liquid crystal device is improved and it becomes possible to readily design a panel structure.

Figure 12A:
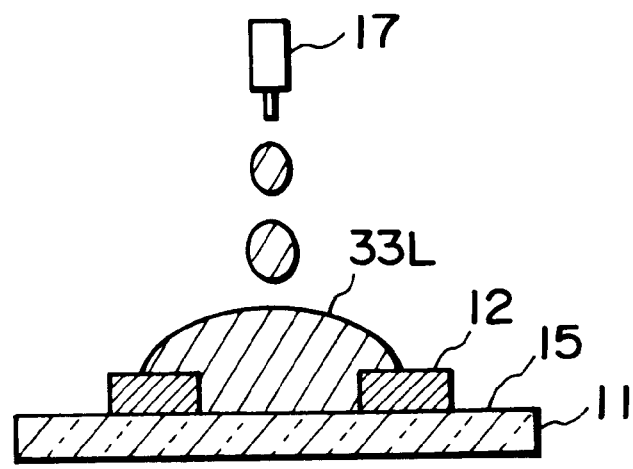
FIGS. 12A–12C are schematic sectional views for illustrating another embodiment of a process for producing the electrode plate of the invention.
Figure 12B:
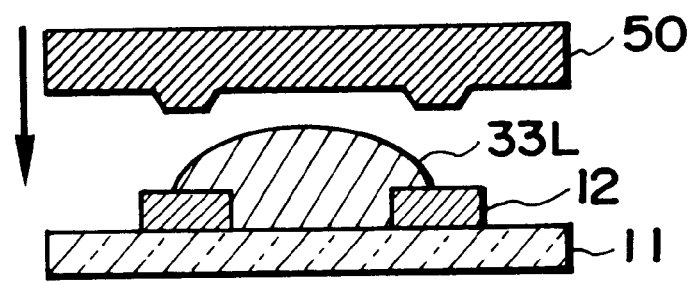
Figure 12C:
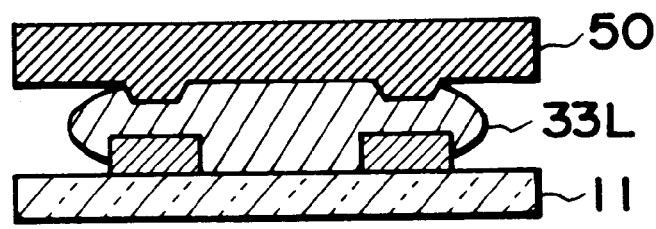

In the present invention, in the resin-supplying step, the prescribed amount of the UV-curable resin 33L may be placed on a spacing between the metal electrodes 12 formed on the glass substrate 11 of the metal wiring plate A1 and on which the mold plate 50 may be superposed to provide a superposed structure as illustrated in FIGS. 12A–12C.

Figure 13A:
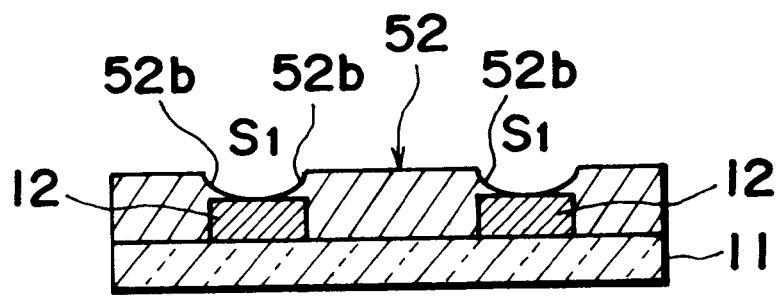
FIGS. 13A–13C are schematic sectional views each illustrating a shape of an insulating resin layer employed in the electrode plate of the invention, respectively.
Figure 13B:
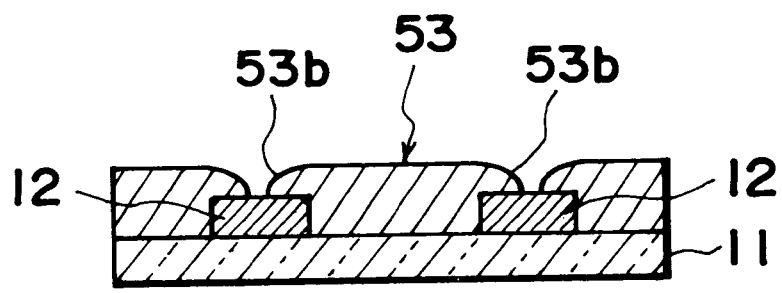
Figure 13C:
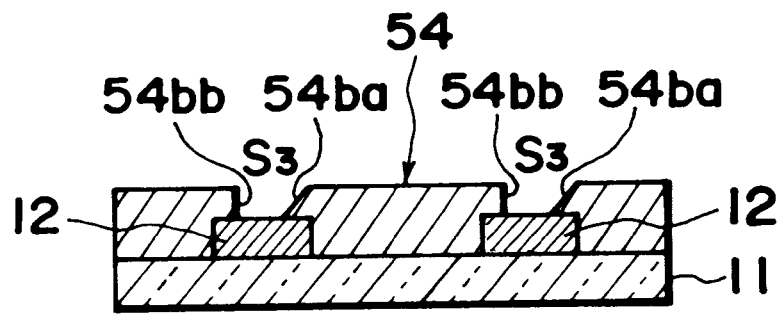

In the present invention, the sectional shape (substantially isosceles trapezoid) of the UV-cured resin 33 at the exposed portion So of the metal electrode 12 as shown in FIG. 9G may be modified into other shapes as shown in FIGS. 13A–13C. More specifically, FIG. 13A illustrates a half-round shape at a portion SI formed by adjacent end portions 52b of a UV-cured resin 52 and FIG. 13B illustrates a cured shape formed by adjacent end portions 53b of a UV-cured resin 53 wherein each end portion 53b is curved in reverse direction with respect to the end portion 52b shown in FIG. 13A. Further, FIG. 13C illustrate a sectional shape of a UV-cured resin 54 at a portion S3 formed by an end portion 54ba providing an oblique plane as in the end portion 33b in the above embodiment and an end portion 54bb providing a vertical plate perpendicular to the metal electrode 12.

<Second Embodiment>

A second embodiment of the electrode plate according to the present invention will be described with reference to FIGS. 14–17.

Figure 14:
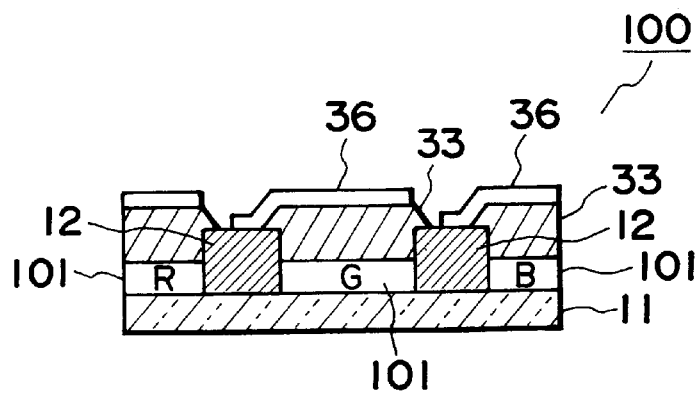
FIGS. 14, 16 and 18 are schematic sectional views each showing an embodiment of the electrode plate of the invention, respectively.

Referring to FIG. 14, an electrode plate 100 includes a glass substrate 101, a plurality of metal electrodes 12 formed on the substrate 101 with a spacing, a color filter 101 comprising color filter segments of red (R), green (G) and blue (B) formed on the substrate 101 so as to partially fill the spacing of the metal electrodes 12, a UV-cured resin layer (insulating layer) 33 formed on the color filter 101 so as to partially fill the spacing of the metal electrodes 12 and partially cover an end portion of the metal electrode surface, and a plurality of transparent electrodes 36 formed on the UV-cured resin layer 33 and electrically connected to the associated metal electrodes 12, respectively.

Figure 15A:
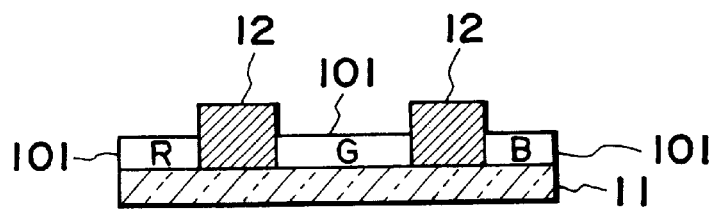
FIGS. 15A–15C, FIGS. 17A–17C and FIGS. 19A–19C are schematic sectional views each for illustrating a series of steps generally involved in a process for producing the electrode plate shown in FIGS. 14, 16 or 18, respectively.
Figure 15B:
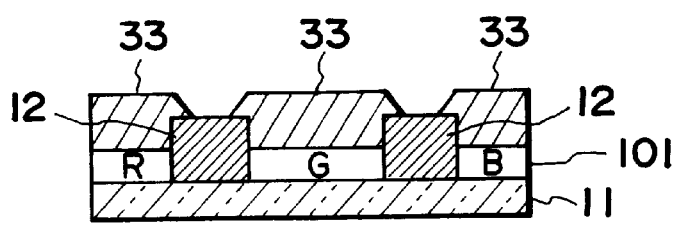

More specifically, as shown in FIG. 15A, the metal electrode-forming step is performed to form the metal electrodes 12 on the glass substrate 11 with a prescribed spacing. At the spacing, the color filter 101 is formed on the glass substrate 11 (color filter-forming step).

Figure 15C:
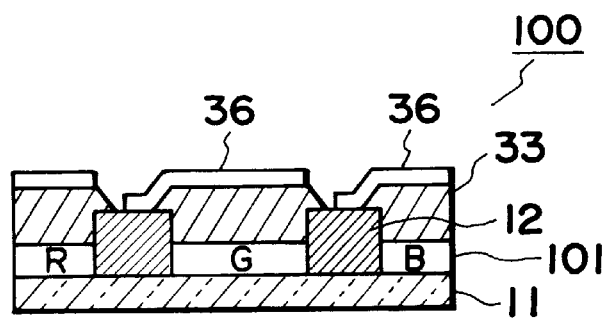

Thereafter, the resin-supplying step, the resin-molding step, the resin-curing step and the peeling step are successively performed in the same manner as in First Embodiment described above to prepare a structure as shown in FIG. 15B having a specific sectional shape of the UV-cured resin layer 33. Then, the transparent electrode-forming step is performed to form a plurality of transparent electrodes 36 on the UV-cured resin 33 and the metal electrodes 12 as shown in FIG. 15C.

By using the thus-prepared two electrode plates 100, a color liquid crystal device is prepared.

According to this embodiment, similar advantageous effects as in First Embodiment can be attained.

In the above embodiment (Second Embodiment), the color filter-forming step may be performed before the metal electrode-forming step.

Figure 16:
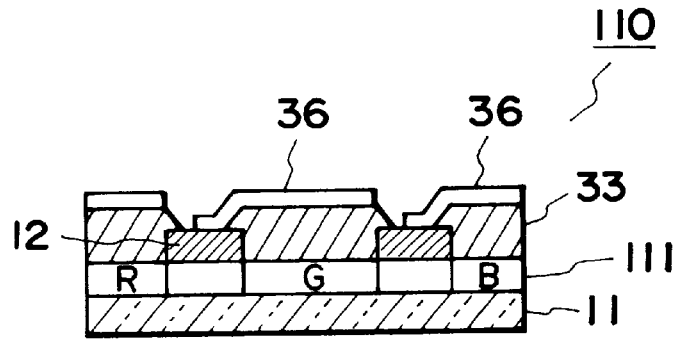

Further, the metal electrodes 12 may be formed on the color filter 111 as in an electrode plate 110 as shown in FIG. 16.

Referring to FIG. 16, a color filter 111 is formed on the entire surface of the glass substrate 11. On the closer filter 111, the metal electrodes 12 ar formed so as to leave a spacing therebetween where respective color filter segments of R, G and B are disposed.

Figure 17A:
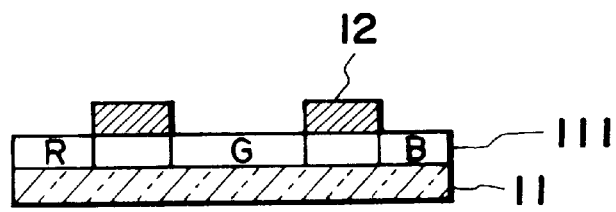
Figure 17B:
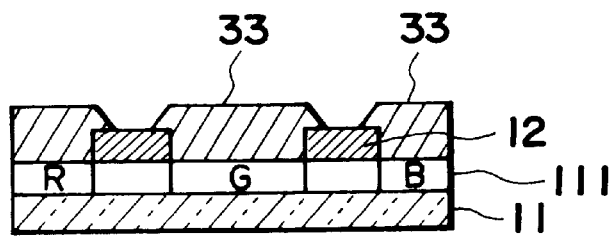
Figure 17C:
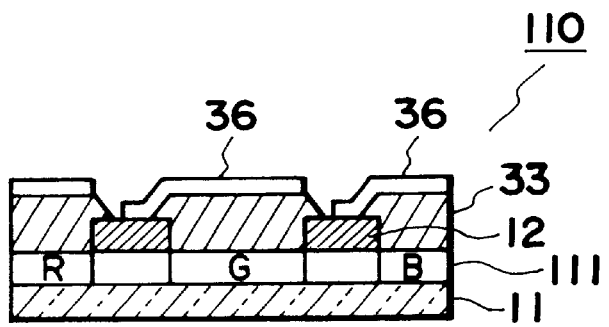

Specifically, as shown in FIG. 17A, the color filter-forming step is first performed to form the color filter 111 on the glass substrate 11 and thereon, the metal electrodes 12 are formed at a prescribed part of the color filter 111. Thereafter, a structure shown in FIG. 7B is formed through the resin-supplying step, the resin-molding step, the resin-curing step, and the peeling step. Then, the transparent electrodes 36 are formed on the above structure to prepare an electrode plate 110 as shown in FIG. 17C.

In this embodiment, the color filter layer 111 may be formed by various methods, including a photolithographic process, a printing process (wet-coating method), a sublimation transfer method, and an ink jet method. In the case of using the ink jet method, an ink-receptive (acceptable) layer is formed on the entire glass substrate 11 by wet-coating, such as spin coating. Thereafter, a prescribed ink including a dye may be injected into the ink-receptive layer with a high accuracy, thus impregnating the layer with the ink.

<Third Embodiment>

A third embodiment of the electrode plate according to the present invention will be explained with reference to FIG. 18 and FIGS. 19A–19C.

In this embodiment, as shown in FIG. 16, an electrode plate 120 has the same structure as in the electrode plate 110 shown in FIG. 14 except for further including a protective layer formed directly on the color filter layer 111.

Figure 19A:
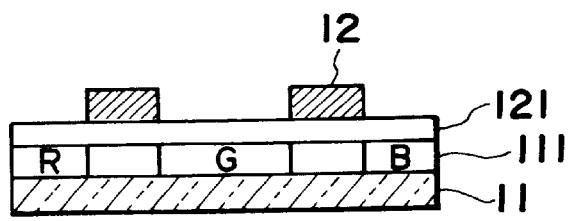

More specifically, referring to FIG. 19A, the color filter-forming step is performed to form the color filter 111 on the glass substrate 11. Thereafter, the protective layer 121 is formed on the entire surface of the color filter 111 (protective layer-forming step). On the protective layer, the metal electrodes 12 is formed at a prescribed portion of the protective layer 121.

Figure 18:
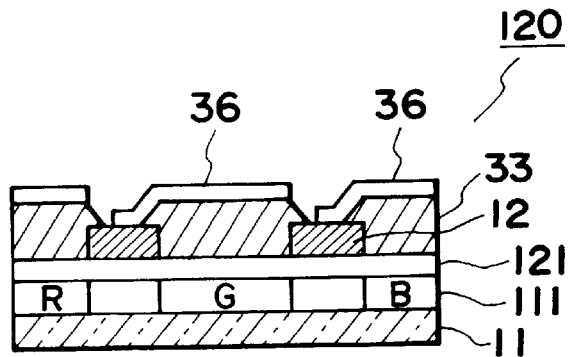
Figure 19B:
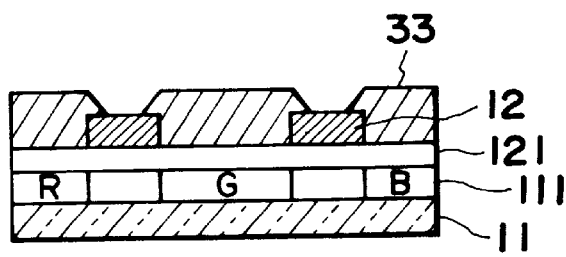
Figure 19C:
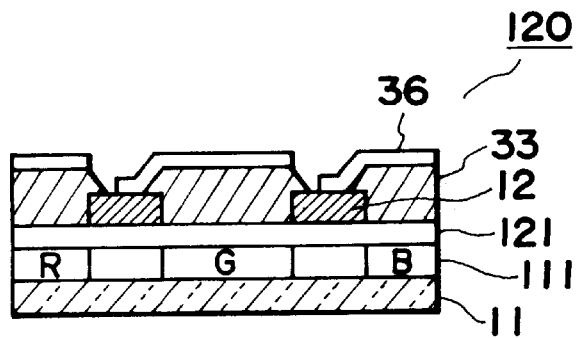

Then, the subsequent steps (resin-supplying, resin-molding, resin-curing and peeling step) are performed to form a structure shown in FIG. 19B, followed by formation of the transparent electrodes 36 as shown in FIG. 18, thus preparing an electrode plate 120.

By using two electrode plates 120 prepared in the above-described manner, a color liquid crystal device is produced.

According to this embodiment, advantageous effects similar to those in First Embodiment can be attained.

Further, in this embodiment, the color filter layer 111 is protected from discoloration (change in color tint) due to the influence of an etchant for patterning of the metal electrodes 12 by the use of the protective layer 121 formed so as to cover the entire surface of the color filter 111.

Hereinbelow, the present invention will be described more specifically based on Examples.

EXAMPLE 1

In this embodiment, a mold plate 50 (200×250×5 mm) comprising a stainless steel plate electrolessly plated with nickel in a thickness of ca. 50 $\mu$m provided with a plurality of projections 50 at the nickel portion was used. The mold plate 50 had a surface finished by polishing. Each projection 51 had a sectional shape of a 2 $\mu$m-high almost isosceles trapezoid substantially including an upper side of 10 $\mu$m, a lower side of 20 $\mu$m (in parallel with the upper side) and two equal sides each providing a slope of 2 in 5 and was arranged at a pitch of 320 $\mu$m. The projections 51 of the mold plate 50 was formed by using a cutting tool 61 having a tip portion having a width of 320 $\mu$m and a slope of 2 in 5 and a super-precision cutting device in combination.

As a glass substrate, a blue plate glass having a size of 210×240×1 mm and polished on both sides was used. Further, as a UV-curable resin 33L, a UV-curable resin composition comprising 50 wt. parts of pentaerithritol triacrylate, 50 wt. parts of neopentyl glycol diacrylate and 2 wt. parts of 1-hydroxycyclohexyl phenyl ketone was used.

A plurality of metal electrodes were made of aluminum and each formed in a thickness of 2 $\mu$m, a width of 30 $\mu$m and a length of 240 mm at a pitch of 320 $\mu$m (which corresponded to that of the projections 51 of the mold plate 50).

A plurality of transparent electrodes were made of ITO and each formed in a thickness of 700 Å, a width of 312 $\mu$m and a length of 240 mm at a pitch of 320 $\mu$m.

An electrode plate 30 was prepared in the following manner.

(Metal electrode-forming step)

On the surface (wiring surface 15) of the above glass substrate 11, a treating liquid of 1 wt. part of a silane coupling agent ("A-174", mfd. by Nippon Uniker K. K.) in 40 wt. parts of ethyl alcohol was applied by spin coating followed by drying at 100° C. for min.

The above-mentioned metal electrodes 12 were formed on the thus-treated glass substrate 11 by puttering under conditions including: a target of aluminum, a substrate temperature 120° C., an ambient gas of $Ar/O_2$ ($O_2$=2000 ppm), a gas flow of 200 SCCM, and an input power of 2.8 kW, followed by patterning (etching) through a photolithographic process to prepare a metal wiring plate A1.

(Resin-supplying step)

On the above-mentioned mold plate 50, 800 mg of the above-mentioned (liquid) UV-curable resin 33L was placed dropwise at a central portion of the mold plate 50 by using a dispenser 17. Thereafter, the metal wiring plate A1 was slowly superposed on the mold plate 50 supplied with the UV-curable resin 33L so as not to include air bubbles therebetween while effecting a positional alignment of center lines of the projections 51 of the mold plate 50 with those of the metal electrodes 12 by using a microscope (magnification=400) in combination, thus forming a pressure-receiving structure B2. At this time, the glass substrate 11 (width=210 mm) was protruded from edges of the mold plate 50 (width=200 mm) in the width direction by 5 mm at each end portion thereof. On the other hand, the mold plate 50 (length=250 mm) was protruded from edges of the glass substrate 11 (length=240 mm) in the longitudinal direction by 5 mm at each end portion thereof.

(Resin-molding step)

The pressure-receiving structure B1 was disposed between a pair of pressing plates 19a and 19b (300×300 mm) of a 5 ton-hydraulic press 19, followed by pressing operation wherein an applied pressure was increased up to 3 ton in about 1 min., kept for 10 min. at 3 ton, and then removed. Thereafter, the pressure-received structure B2 was taken out from the hydraulic press 19.

(Resin-curing step)

The pressure-received structure B2 was irradiated with UV rays for 2 min. at an illuminance of 15 mW/cm$^2$ (so as to give a total energy of 1800 mJ/cm$^2$ from outside the glass substrate 11 by using a UV lamp comprising four 100 W high-pressure mercury lamps.

(Peeling step)

After completing the curing of the UV-curable resin 33L (i.e., formation of the UV-cured resin layer), the mold plate 50 was peeled or removed from the above-treated pressure-received structure B2 by using a peeling device. More specifically, the peeling operation was performed by pushing the protruded end portions (in the longitudinal direction) of the mold plate 50 while fixing the pressure-received structure B2 at their protruded end portions (in the width direction).

(Transparent electrode-forming step)

The above-described transparent electrodes 36 having a prescribed pattern were formed on the UV-cured resin layer 33 and metal electrodes 12 so as to be arranged along the metal electrodes 12 by sputtering under conditions including: a target of ITO, a substrate temperature of 50–60° C., an ambient gas of $Ar/O_2$ ($O_2$=0.5%), Ar gas pressure of 7 mTorr, followed by patterning (etching) through a photolithographic process.

(Other steps)

An insulating film 7 comprising $SiO_2$ was formed on the transparent electrodes 36 and thereon, an alignment control film 9 comprising polyimide was formed to prepare an electrode plate 30.

The thus-prepared pair of electrode plates 30 were applied to each other via a sealing member 2 with a gap, which was then filled with a chiral smectic liquid crystal 3 to produce a liquid crystal device.

The resultant liquid crystal device provided advantageous effects similar to those in First Embodiment described hereinabove.

EXAMPLE 2

A liquid crystal device was prepared in the same manner as in Example 1 except that in the resin-supplying step a UV-curable resin 33L was placed dropwise on a metal wiring plate A1, whereby good results were attained similarly as in Example 1.

EXAMPLE 3

A color liquid crystal device was prepared in the same manner as in Example 1 except that a 1 μm-thick color filter layer 101 comprising segments of red (R), green (G) and blue (B) as shown in FIG. 14 was formed in the same manner as in Second Embodiment described above and an additional UV-ray irradiation was performed.

More specifically, the color filter layer 101 was formed with pigment-type color filter materials (mfd. by Ube Kosan K. K.) by a photolithographic process including an etching step.

The irradiation of UV-rays was performed for 2 min. from the UV-curable resin side after the peeling step.

The resultant color liquid crystal device provided good color images and good results similarly as in Example 1.

EXAMPLE 4

A color liquid crystal device was prepared in the same manner as in Example 1 except that a 0.8 μm-thick color filter layer 111 as shown in FIG. 16 was formed in the following manner.

A hydrophilic acrylic resin-based ink receptive layer was formed on a glass substrate 11 and impregnated with water soluble dye-type inks for color filter segments (R, G, B) (mfd. by Canon K. K.), respectively, by injecting the inks into the ink receptive layer by means of an ink jet printer (mfd. by Canon K. K.), followed by hot baking at 200° C. for 30 min. to form a 0.8 μm-thick color filter layer 111.

The color liquid crystal device provided good results similarly as in Example 3.

EXAMPLE 5

A color liquid crystal device was prepared in the same manner as in Example 4 except that protective layer 121 as shown in FIG. 18 was formed on a color filter layer 111 in the following manner.

A transparent coating liquid comprising polyamide (mfd. by Ube Kosan K. K.) for forming a protective layer was applied onto the surface of the color filter layer 111 by spin coating, followed by baking to form a ca. 0.5 μm-thick protective layer 121.

The color liquid crystal device provided advantageous effects similar to those in Third Embodiment described above.

As described hereinabove, according to the present invention, the transparent electrodes are formed along the metal electrodes while ensuring good electrical connection therebetween, it is possible to provide a liquid crystal device free from a problem of a voltage waveform deformation due to electrical signal delay. Further, the resultant liquid crystal device can have a large picture area and a high resolution.

Further, the UV-cured resin and the metal electrode do not form a horizontal plane in combination but form a stepwise shape at a central portion of each metal electrode, so that it is not necessary to provide a spacing between the transparent electrode and the adjacent metal electrode and it becomes possible to extend an end portion of the transparent electrode to the position where an edge of the end portion is substantially aligned with or partially overlaps with a side edge of the metal electrode when viewed from a vertical direction. As a result, it is unnecessary to form a masking layer, thus increasing an opening rate of a display region leading to a bright display image. For this reason, it becomes possible to reduce a luminance of the backlight device, thus resulting in a liquid crystal display device of a high brightness and a reduced power consumption. Further, the omission of the masking layer simplifies the production process, thus reducing a production cost. In addition, the respective transparent electrodes can approach the adjacent transparent electrodes by utilizing the stepwise shape thereof, respectively, so that a switching region of the liquid crystal is expanded, thus improving image qualities.

According to the present invention, the UV-curable resin is mold into a prescribed sectional shape with precise accuracy since the mold plate having a high flatness is used therefor. As a result, the production process is simplified and it is possible to prevent a breakage of the transparent electrodes leading to conduction failure. Further, a flatness of a thicker portion 33a of the UV-cured resin is improved when compared with the case of using a spin coating method, so that the upper layers formed thereon, such as the transparent electrodes, the insulating film 7 and the alignment control film are also improved in flatness correspondingly, thus ensuring a uniform cell gap while retaining a good alignment characteristic of the liquid crystal. As a result, a production yield of the liquid crystal device is improved and it becomes possible to readily design a panel structure.

In the case where the liquid crystal device is designed so as to provide a color liquid crystal device employing a color filter, the resultant color liquid crystal device provide good color images while retaining the above-mentioned effects.

Further, in the case where a protection layer is formed on a color filter layer in production of a color liquid crystal device, decoloration of the color filter layer can effectively be suppressed during the step of forming transparent electrodes.

What is claimed is:

1. An electrode plate, comprising: a light-transmissive substrate, a plurality of metal electrodes disposed on the light-transmissive substrate with a spacing therebetween, an insulating layer disposed at the spacing, and a plurality of transparent electrodes disposed on the insulating layer and each electrically connected with an associated metal electrode at a first end portion thereof, wherein said first end portion of the transparent electrode is located closer to the light-transmissive substrate than an adjacent end portion of an adjacent transparent electrode, and each transparent electrode has an edge at a second end portion opposite to the first end portion and electrically insulated from an adjacent metal electrode having an adjacent edge, said edge of the transparent electrode being substantially aligned with said adjacent edge of the adjacent metal electrode when viewed from a direction perpendicular to the light-transmissive substrate.

2. An electrode plate, comprising: a light-transmissive substrate, a plurality of metal electrodes disposed on the light-transmissive substrate with a spacing therebetween, an insulating layer disposed at the spacing, and a plurality of transparent electrodes disposed on the insulating layer and each electrically connected with an associated metal electrode at a first end portion thereof, wherein said first end portion of the transparent electrode is located closer to the light-transmissive substrate than an adjacent end portion of an adjacent transparent electrode, and each transparent electrode has an edge at a second end portion opposite to the first end portion and electrically insulated from an adjacent metal electrode having an adjacent edge, said edge of the transparent electrode substantially overlapping with said adjacent edge of the adjacent metal electrode when viewed from a direction perpendicular to the light-transmissive substrate.

3. An electrode plate, comprising: a light-transmissive substrate, a plurality of metal electrodes disposed on the light-transmissive substrate with a spacing therebetween, an insulating layer disposed at the spacing, and a plurality of transparent electrodes disposed on the insulating layer and each electrically connected with an associated metal electrode at a first end portion thereof, wherein said first end portion of the transparent electrode is located closer to the light-transmissive substrate than an adjacent end portion of an adjacent transparent electrode, said electrode plate further comprising a color filter disposed between the light-transmissive substrate and the insulating layer.

4. A plate according to any one of claims 1, 2, and 3, wherein the insulating layer includes an end portion partially covering an associated metal electrode and the end portion forms an oblique plane at an inclination angle of 15–60 degrees with respect to a surface of the metal electrode.

5. A plate according to any one of claims 1, 2, and 3, wherein the insulating layer has a sectional shape of an isosceles trapezoid substantially including two parallel sides having different lengths and two non-parallel sides having identical length in a direction perpendicular to a longitudinal direction of the insulating layer.

6. A plate according to any one of claims 1, 2, and 3, wherein the insulating layer comprises a ultraviolet-cured resin.

7. A liquid crystal device, comprising: a pair of electrode plates and a liquid crystal disposed between the electrode plates;

at least one of the electrode plates comprising a light-transmissive substrate, a plurality of metal electrodes disposed on the light-transmissive substrate with a spacing therebetween, an insulating layer disposed at the spacing, and a plurality of transparent electrodes disposed on the insulating layer and each electrically connected with an associated metal electrode at a first end portion thereof, wherein said first end portion of the transparent electrode is located closer to the light-transmissive substrate than an adjacent end portion of an adjacent transparent electrode, and each transparent electrode has an edge at a second end portion opposite to the first end portion and electrically insulated from an adjacent metal electrode having an adjacent edge, said edge of the transparent electrode being substantially aligned with said adjacent edge of the adjacent metal electrode when viewed from a direction perpendicular to the light-transmissive substrate.

8. A liquid crystal device, comprising: a pair of electrode plates and a liquid crystal disposed between the electrode plates:

at least one of the electrode plates comprising a light-transmissive substrate, a plurality of metal electrodes disposed on the light-transmissive substrate with a spacing therebetween, an insulating layer disposed at the spacing, and a plurality of transparent electrodes disposed on the insulating layer and each electrically connected with an associated metal electrode at a first end portion thereof, wherein said first end portion of the transparent electrode is located closer to the light-transmissive substrate than an adjacent end portion of an adjacent transparent electrode, and each transparent electrode has an edge at a second end portion opposite to the first end portion and electrically insulated from an adjacent metal electrode having an adjacent edge, said edge of the transparent electrode substantially overlapping with said adjacent edge of the adjacent metal electrode when viewed from a direction perpendicular to the light-transmissive substrate.

9. A liquid crystal device comprising: a pair of electrode plates and a liquid crystal disposed between the electrode plates;

at least one of the electrode plates comprising a light-transmissive substrate, a plurality of metal electrodes disposed on the light-transmissive substrate with a spacing therebetween, an insulating layer disposed at the spacing;

a plurality of transparent electrodes disposed on the insulating layer and each electrically connected with an associated metal electrode at a first end portion thereof, wherein said first end portion of the transparent electrode is located closer to the light-transmissive substrate than an adjacent end portion of an adjacent transparent electrode; and a color filter disposed between the light-transmissive substrate and the insulating layer.

10. A device according to any one of claims 7, 8, and 9, wherein the insulating layer includes an end portion partially covering an associated metal electrode and the end portion forms an oblique plane at an inclination angle of 15–60 degrees with respect to a surface of the metal electrode.

11. A device according to any one of claims 7, 8, and 9, wherein the insulating layer has a sectional shape of an isosceles trapezoid substantially including two parallel sides having different lengths and two non-parallel sides having identical length in a direction perpendicular to a longitudinal direction of the insulating layer.

12. A device according to any one of claims 7, 8, and 9, wherein the insulating layer comprises a ultraviolet-cured resin.

* * * * *

UNITED STATES PATENT AND TRADEMARK OFFICE
CERTIFICATE OF CORRECTION

PATENT NO.    : 6,023,318
DATED         : February 8, 2000
INVENTOR(S)   : HARUO TOMONO ET AL.

It is certified that error appears in the above-identified patent and that said Letters Patent is hereby corrected as shown below:

ON THE COVER PAGE:

Under column [56], Foreign Patent Documents,
"6347819  12/1994" should read --6-347819  12/1994--.

COLUMN 6

Line 17, Right Margin should be closed up; and
Line 18, Left Margin should be closed up.

COLUMN 8

Line 22, "difference" should read --different--.

COLUMN 17

Line 30, "mold" should read --molded--.

COLUMN 18

Line 48, "a" should read --an--.

UNITED STATES PATENT AND TRADEMARK OFFICE
CERTIFICATE OF CORRECTION

PATENT NO.  : 6,023,318
DATED       : February 8, 2000
INVENTOR(S) : HARUO TOMONO ET AL.

It is certified that error appears in the above-identified patent and that said Letters Patent is hereby corrected as shown below:

COLUMN 20

Line 26, "a" should read --an--.

Signed and Sealed this

Twenty-fourth Day of April, 2001

Attest:

NICHOLAS P. GODICI

*Attesting Officer*    *Acting Director of the United States Patent and Trademark Office*